United States Patent [19]
Loquenz et al.

[11] 3,818,681
[45] June 25, 1974

[54] GAS SCRUBBING METHOD AND APPARATUS

[75] Inventors: Heinz Loquenz; Horst Weber, both of Vienna, Austria

[73] Assignee: Waagner-Biro Aktiengesellschaft, Vienna, Austria

[22] Filed: July 27, 1971

[21] Appl. No.: 166,420

[30] Foreign Application Priority Data
Feb. 1, 1971  Austria .................................. 835/71

[52] U.S. Cl. ...................... 55/90, 55/226, 55/240, 55/257, 55/260, 55/345, 55/457, 261/62, 261/118, 261/DIG. 54
[51] Int. Cl. ............................................ B01d 47/10
[58] Field of Search ....... 55/90, 226, 240, 241, 257, 55/260, 345, 457; 261/DIG. 54, 112, 118, 62

[56] References Cited
UNITED STATES PATENTS

| | | | |
|---|---|---|---|
| 2,871,973 | 2/1959 | Roujob | 261/DIG. 54 |
| 2,913,232 | 11/1959 | Silverman | 261/DIG. 54 |
| 3,199,267 | 8/1965 | Hausberg | 261/DIG. 54 |
| 3,556,489 | 1/1971 | Ueda | 261/118 |
| 3,616,613 | 11/1971 | Loquenz et al. | 261/DIG. 54 |
| 3,626,667 | 12/1971 | Mare | 261/116 |
| 3,631,656 | 1/1972 | Hausberg et al. | 55/257 |
| 3,675,397 | 7/1972 | Deacon | 261/DIG. 54 |

*Primary Examiner*—Bernard Nozick
*Attorney, Agent, or Firm*—Steinberg & Blake

[57] ABSTRACT

A gas scrubbing method and apparatus according to which the gas which is to be cleaned is directed upwardly toward the throat of a Venturi while a curtain of liquid is dropped downwardly along the upwardly flowing gas at the entrance to the Venturi so that the gas will direct the falling liquid upwardly with the gas through the throat of the Venturi after which the liquid is separated from the gas and returned to the falling curtain of liquid. The Venturi is arranged vertically with the gas flowing upwardly along the interior thereof, and the structure which supplies the liquid is situated at the entrance zone of the Venturi and acts as a baffle for dividing the gas into subsidiary streams which become united at the throat of the Venturi. The Venturi throat is adjusted by a suitable adjusting structure so as to have a cross section adapted to the gas flowing through the Venturi, and the curtain of liquid engaged by the upwardly flowing gas is formed into droplets which are distributed throughout the cross section of the gas.

6 Claims, 3 Drawing Figures

GAS SCRUBBING METHOD AND APPARATUS

BACKGROUND OF THE INVENTION

The present invention relates to gas scrubbing methods and apparatus.

As is well known, gases are cleaned by scrubbers where liquid droplets will be suspended in the gas to remove impurities therefrom. The gas-cleaning liquid is conventionally introduced into the gas stream by way of suitable nozzles.

Known methods and apparatus of the above general type require a large amount of fresh washing liquid, and an additional disadvantage of the known methods and apparatus resides in the fact that the liquid directed through the nozzles cannot have therein any materials which may have a tendency to obstruct the nozzles.

SUMMARY OF THE INVENTION

It is accordingly a primary object of the present invention to provide a method and apparatus which will avoid the above drawbacks.

In particular, it is an object of the present invention to provide a method and apparatus which make it possible to recirculate the gas-washing liquid so that a large supply of fresh washing liquid is not required.

Also it is an object of the present invention to provide a method and apparatus which make it possible to clean a gas without directing the washing liquid through nozzles, so that it becomes possible to suspend in the liquid materials which otherwise might tend to clog nozzles.

Also, it is an object of the present invention to provide a method and apparatus which will distribute throughout a gas which is to be cleaned liquid droplets which will very effectively remove from the gas not only impurities suspended therein but also harmful gaseous components.

According to the method of the invention the gas which is to be cleaned is directed upwardly through a Venturi into a coverging portion thereof and then through a throat and diverging portion thereof. Simultaneously a curtain of cleaning liquid is dropped at the entrance zone of the Venturi so that the gas engages the falling curtain of liquid and redirects the same upwardly through the Venturi in the form of droplets distributed throughout the cross section of the upwardly flowing stream of gas. Downstream of the Venturi the liquid is separated from the gas and is then redirected to the falling curtain so that the liquid is recirculated.

The apparatus of the invention includes at the entrance zone to the Venturi a liquid-supply means which provides for overflow of the liquid so that it falls from the liquid-supply means to form the falling curtain engaged by the upwardly flowing gas. An adjusting means is provided for adjusting the throat of the Venturi in accordance with the amount of gas flowing therethrough. Downstream of the Venturi is a cyclone means for separating liquid from the gas, and a conduit means provides for a return of the separated liquid to the liquid-supply means. An adjusting means coacts with the liquid-supply means for adjusting the position of the latter, and the liquid-supply means is preferably situated centrally in the Venturi and acts as a baffle for dividing the gas stream into a pair of subsidiary streams which are united at the throat of the Venturi. Between the Venturi means and the cyclone means is a flow-control means for providing a uniform flow of fluid, this flow-control means taking the form, for example, of a perforated cone through which the fluid must flow.

BRIEF DESCRIPTION OF DRAWINGS

The invention is illustrated by way of example in the accompanying drawings which form part of this application and in which.

DESCRIPTION OF PREFERRED EMBODIMENTS

Figure 1:
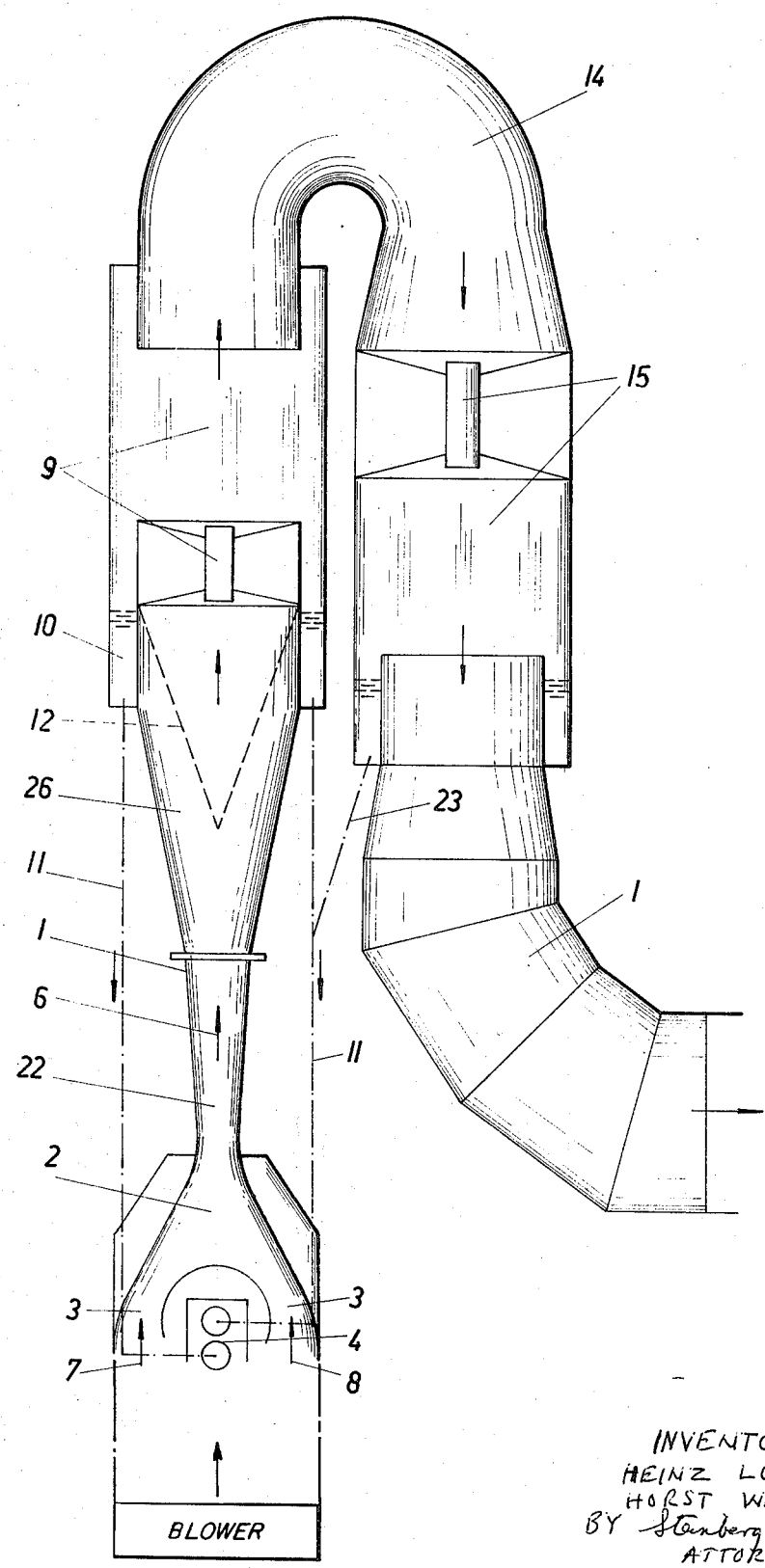
FIG. 1 is a schematic elevation of a gas scrubber according to the invention for carrying out the method of the invention.

Referring now to FIG. 1 there is schematically illustrated therein a gas-scrubber according to the present invention. Part of a vertically extending closed conduit means 1 forms a Venturi means 2. For this purpose the conduit 1 may include an outer elongated pipe in which the Venturi means 2 is situated with the diverging portion 22 of the Venturi means extending upwardly beyond the outer pipe which encloses the throat and converging portion as well as the entrance zone of the Venturi, as indicated at the lower part of FIG. 1. Any suitable blower or the like is used to propel the raw gas which is to be cleaned upwardly along the interior of the Venturi means 2, as indicated by the arrow 6 in FIG. 1. Thus, the lower part of FIG. 1 schematically illustrates how a blower is connected with the Venturi means 2 so as to form a gassupply means connected to an inlet of the Venturi means beneath the liquid-supply means 4, referred to below, for directing gas to be cleaned upwardly along the interior of the Venturi means toward the liquid supply means. The Venturi means 2 has a lower entrance zone 3 provided with a liquid-supply means 4 which is situated centrally within the entrance zone 3. The Venturi means 2 is preferably of rectangular cross section and has side walls perpendicular to the plane of FIG. 1. The liquid-supply means 4 is situated in the entrance zone 3 centrally thereof in the sense that the liquid-supply means 4 extends perpendicularly across the axis of the Venturi and is situated midway between the side walls thereof. Thus, the liquid-supply means 4 is in the form of an elongated tubular enclosure or trough which extends horizontally across the perpendicular axis of the Venturi. As is indicated schematically in FIG. 2, the liquid-supply means 4 supplies liquid in such a way that the liquid collected in the liquid-supply means overflows out of the latter to form a pair of falling curtains of liquid 5, and these falling curtains of liquid 5 drop with no forces applied thereto except for the gravitational forces resulting from overflow of the liquid out of the liquid-supply means 4. The situation of the liquid-supply means 4 in the manner described above extending horizontally across the axis of the Venturi midway between the side walls thereof, enables the liquid-supply means 4 to function also as a baffle which divides the incoming stream 6 of raw gas, which is directed between the falling curtains 5, at least initially into a vertically extending passage enclosed at least in part by the falling liquid walls formed by the curtains 5, into a pair of subsidiary streams 7 and 8 which flow around the liquid-supply means 4 between the latter and the Venturi side walls, respectively. The liquid-supply means 4 is situated in alignment with and beneath the throat of the Venturi in relatively close proximity thereto so that the subsidiary streams 7 and 8 again join each other at the Venturi throat, which is the narrowest part of the Venturi, or in other words the part of the Venturi which has the smallest cross section, so that a single fluid stream is again formed at the Venturi throat to continue flowing upwardly along the Venturi. Downstream of the narrowest part of the Venturi at the throat thereof the cross section of the Venturi becomes gradually wider through the diverging portion 22 thereof which forms a diffuser along the interior of which the fluid flows.

A cyclone separator means 9 is situated downstream of the Venturi means 2, which is to say downstream of the diverging portion 22 thereof, for receiving the fluid from the Venturi in order to separate the liquid phase from the gaseous phase thereof. The liquid separated by the cyclone means 9 is received in a receiving means 10 in the form of suitable chambers into which the centrifugally separated liquid falls. Thus the cyclone means 9 will in a known way provide whirling of the gas and liquid droplets around the vertical axis of the Venturi downstream of the latter, so that the heavier liquid particles will be thrown out to the side walls and will collect in the receiving means 10. Return conduit means 11 communicate with the receiving means 10 and also communicate with the liquid-supply means 4 so as to return to the latter the liquid separated by the cyclone means, and in this way at least a partial recirculation of the washing liquid is provided. In the illustrated example there are a pair of return conduits 11. These may be provided with unillustrated control devices for controlling the return flow of the washing liquid as well as for providing at least a relatively course cleaning of the liquid before it reaches the liquid-supply means 4. For example suitable filters may be provided in the return flow conduits 11 to filter out particles from the liquid. Also, for a purpose referred to below, these conduits can be provided with devices for introducing desirable components into the washing liquid.

A flow-control means is situated between the Venturi means 2 and the cyclone means 9 for providing a uniform flow of the fluid from the Venturi means to the cyclone means. In the illustrated example this flow control means takes the form of a perforated plate 12 having the form of a hollow cone, so that the fluid must flow through the perforations of this cone before reaching the part of the cyclone means where separation of the liquid from the gaseous phase takes place, and in this way a uniformity in the flow of the fluid to the cyclone means is achieved. The conduit means 1 is provided between the diffuser or diverging portion 22 of the Venturi means and the cyclone means 9 with a diverging conduit portion 26 which continues the gradual widening of the diffusing portion 22, and it is in this conduit portion 26 that the flow-control means 12 is located.

Downstream of the cyclone means 9 the scrubber of the invention includes an additional conduit means for changing the direction of flow of the fluid. For this purpose the scrubber has a curved conduit portion 14 communicating with the cyclone means 9 to receive therefrom gas from which liquid has been separated, and this conduit means 14 curves through 180° so as to change the direction of gas flow from an upward flow to a downward flow.

Figure 2:
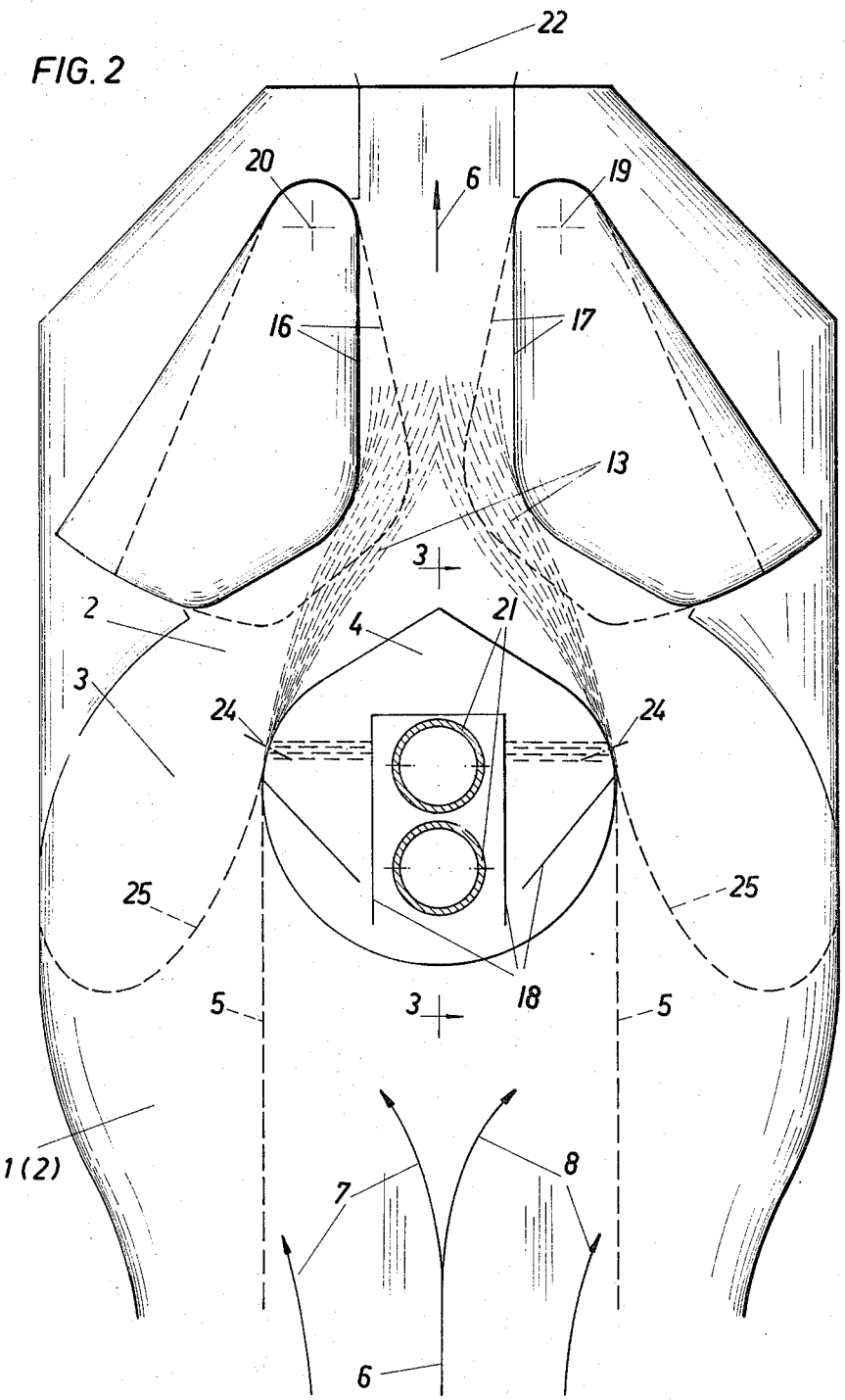
FIG. 2 is a schematic illustration at a scale which is enlarged as compared to FIG. 1 of that part of the gas scrubber where the gas enters into the Venturi means, FIG. 2 illustrating details of the liquid-supply means and the Venturi means itself.
Figure 3:
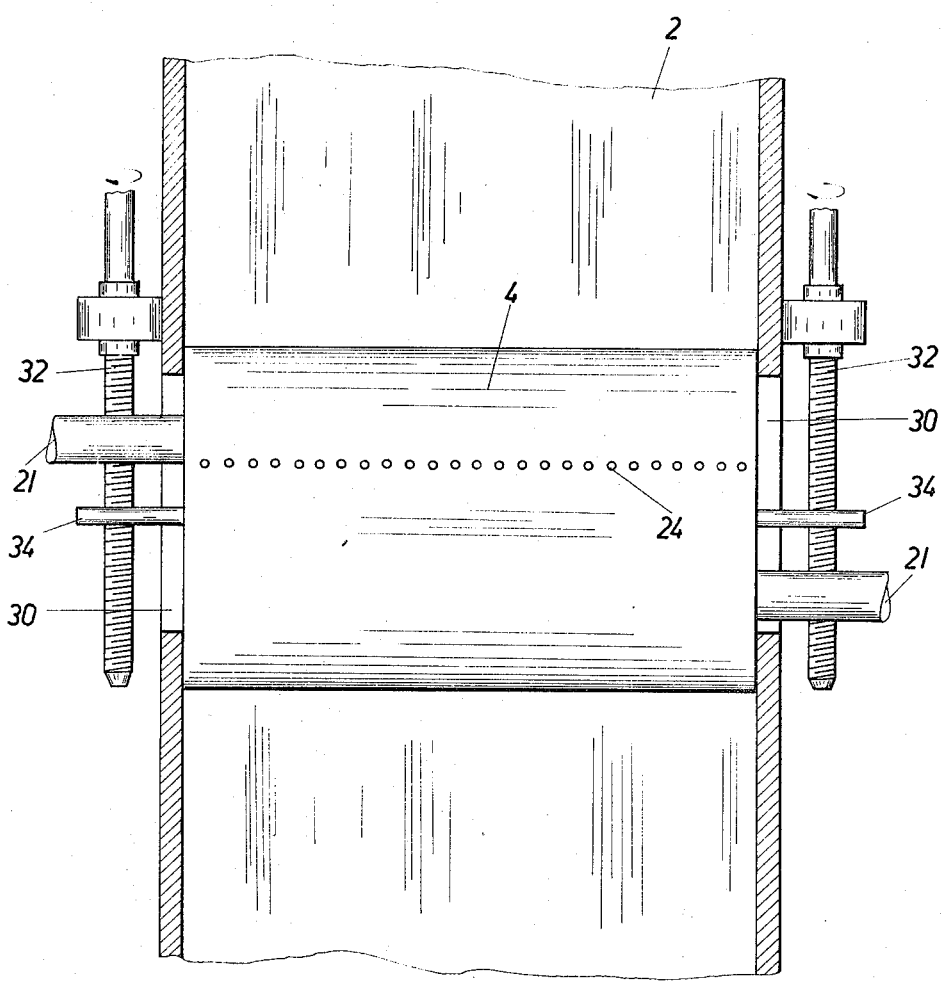
FIG. 3 is a fragmentary sectional elevation taken along line 3—3 of FIG. 2 in the direction of the arrows and illustrating further details.

Downstream of the conduit means 14 is an additional cyclone means 15 which receives the fluid from the conduit means 14. In the cyclone means 15, further separation of liquid from gas takes place in a well known manner, and the separated liquid again collects in a peripheral receiving chamber communicating with a return conduit 23 which communicates with one of the conduits 11, so that from the additional cyclone means 15 there is an additional return of treating liquid to the liquid-supply means 4. FIG. 2 schematically illustrates details of the entrance zone 3 and the structure situated just above the latter. Thus, it is apparent from FIG. 2 that the liquid-supply means 4 is in the form of an elongated horizontally extending pipe or tube which is perpendicular to the plane of FIG. 2 and at a suitable elevation along its opposed side wall portions this pipe of the liquid-supply means is formed with horizontal rows of perforations 24 through which the treating liquid overflows to fall from these perforations and form the freely falling pair of overflow curtains 5. FIG. 3 illustrates to the arrangement of the openings 24 along one side of the liquid-supply means 4.

When the raw gas 6 is delivered at full load upwardly through the Venturi means, the falling overflow curtains 5 have their directions of flow completely reversed and are formed by the energy of the upwardly flowing gas into a field of droplets 13 having the configuration shown in FIG. 2 from which it is apparent that the falling curtains 5 are converted into a field of droplets distributed throughout the entire cross section of the upwardly flowing gas. Thus, the falling curtains 5 are conveyed by the upwardly flowing gas stream away from the falling direction into the direction of travel of the gas stream. In the event that there is a relatively weak flow of gas at relatively low speed with only partial load, the curtains 5 may be curved to take the form of the curved walls of liquid 25 schematically represented in FIG. 2, and in this case also there is a simultaneous distribution of the washing liquid throughout the entire cross section of the flowing gas stream so that the best possible cleaning effect is achieved.

The liquid-supply means 4 is provided in its interior with a means for preventing waves or turbulence in the collected liquid. Thus, the conduits 11 respectively communicate with horizontal conduits 21 which direct the returned liquid into the liquid-supply means 4, as is also indicated in FIG. 3, and these pipes or conduits 21 are almost completely surrounded by an inner group of plates 18 while situated in the interior of the liquid-supply means 4 there are also the inclined baffle plates indicated in FIG. 2. These plates serve to prevent turbulence or waves in the liquid collected within the liquid-supply means 4, so that a smooth flow of liquid through the apertures 24 is assured. The pipes 21 of course have open ends within the interior of the supply means 4. Thus, by way of the control means 18 which controls the collected liquid so as to prevent turbulence or waves therein, a lack of uniformity in the scrubbing procedures is avoided.

It is preferable to mount the liquid-supply means 4 so that it can be adjusted in elevation. For this purpose, as shown in FIG. 3, the Venturi means 2 may be provided at its front and rear walls with elongated openings 30 which are at all times closed by the end walls of the liquid-supply means 4, so that in this way the interior of the Venturi means is maintained fluid-tightly closed off from the outer atmosphere. At its exterior the Venturi means 2 carries at its front and rear walls on suitable bearings rotary screws 32 which are threaded through extensions 34 which are fixed to the closed end walls of the supply means 4 and which extend through the openings 30 in the manner shown schematically in FIG. 3. These rotary screws 32 and extensions 34 are situated to one side of the pipes 21 which extend fluid-tightly through the end walls of the liquid-supply means 4. Thus, by turning the screws 32 it is possible to raise or lower the liquid-supply means 4 so as to adjust the elevation thereof, and these screws 32 may be manually turned or may be automatically turned in response to suitable signals. Thus, by controlling the elevation of the liquid-supply means it is possible to control the stream of fluid. Thus, by situating the liquid-supply means nearer to or further from the throat of the Venturi, it is possible because of the baffle-type of action of the liquid-supply means, to control the manner in which the gas is divided to form the subsidiary streams, as well as to control the subsidiary streams, and thus it is possible to control the treatment of the gas through this elevational adjustment of the liquid-supply means 4. It is possible, for example, to provide a means which responds automatically to the rate of flow of the raw gas so as to regulate automatically the elevation of the liquid-supply means in accordance with the speed with which the gas flows through the Venturi means.

FIG. 2 illustrates additional possible adjustments. Thus, for example, it is possible to adjust the size of the throat of the Venturi. In the illustrated example this is brought about by a pair of swingable sector-shaped Venturi wall portions 16 and 17 which are supported for swinging movement about the horizontal axes 19 and 20, so that by adjusting the angular positions of the sector-shaped wall portions 16 and 17 it becomes possible to control the size of the constriction at the Venturi throat. FIG. 2 shows the wall portion 16 and 17 in one position in solid lines and in a second position in dotted lines. In this case also it is possible to provide a means which will automatically detect the amount of gas flowing through the Venturi means and in accordance with the detected amount of gas will provide automatically a signal for providing an automatic control of the angular position of the sector-shaped Venturi wall portions 16 and 17. However, instead of using sector-shaped wall portion 16 and 17 it is also possible to use hinge plates in the form of simple swingable flat plates which can be adjusted not only for controlling the size of the cross section of the Venturi of the throat thereof but also in order to provide sharp edges having a configuration which will change a laminar flow to a turbulent flow and which will form whirl chambers in which the fluid will assume a whirling motion facilitating the treatment of the gas.

Of course, instead of the illustrated symmetrical construction and arrangement of the liquid-supply means so that it forms a baffle dividing the stream into a pair of subsidiary streams, this baffle-function can be eliminated in which case the liquid-supply means can be mounted so as to extend horizontally along one of the walls of the conduit means 1 at the entrance zone of the Venturi means 2, for example. Thus, in this case the liquid-supply means 4 may form a liquid container having an inner wall which extends across the interior of and defines part of the inner surface of the Venturi, this wall then being formed with apertures such as the openings 24 in order to provide a falling curtain of liquid to engage the upwardly flowing gas.

It is to be noted that with the method of the invention the gas is directed upwardly toward the converging portion of the Venturi inside a passage which is defined at least in part by the falling curtains of liquid 5, while at the same time travel of the gas directly to the throat of the Venturi is blocked by the baffle structure which is formed by the liquid-supply means so that the gas is compelled to flow around the baffle structure from the inside of the passage which is defined at least in part by the falling curtains 5 to the outside of the passage, the gas being delivered at a speed sufficiently great to deflect the curtains of liquid upwardly into the throat of the Venturi with the gas in the form of droplets which are spread throughout the entire cross section of the gas which flows through the throat of the Venturi, so that in this way an exceedingly effective cleaning action is achieved with the gas and liquid droplets suspended therein being carried along upwardly beyond the throat of the Venturi to the cyclone where the liquid is separated from the gas and returned to the liquid-supply means as described above.

Thus, with the apparatus of the invention the liquid-supply means forms not only a baffle around which the gas is deflected in the converging zone of the Venturi before reaching the throat of the Venturi, but in addition the liquid-supply means supplies a curtain of liquid which defines at least part of the passage in which the gas travels toward the baffle structure formed by the liquid-supply means so that the gas must deflect the curtain of liquid while traveling out of the passage defined by the falling curtain, so that the gas will become intimately associated with the liquid curtain which is deflected, breaking the curtain up into droplets which are carried along with the gas up through the throat of the Venturi.

It is particularly to be noted that with the structure of the invention the liquid-supply means requires no nozzles through which the liquid is delivered under pressure to the interior of the Venturi means. The use of such nozzles makes the use of clear treating liquid essential since any particles in the liquid would tend to clog the nozzles. Therefore, by reason of the fact that such nozzles are not required with the structure of the invention, it is possible to suspend in the liquid desirable components and it is possible to wash the gas with suitable slurries, for example. In this way it is possible to control the composition of the washing liquid, as by introducing desirable components into the liquid at suitable locations of the conduits 11, as pointed out above. Special slurries such as slurries containing active carbon particles may be provided, and in this way the washing liquid can be used not only to remove solids from the gas but also to absorb undesirable gases which are included in the raw gas, and of course in this way it is possible to remove harmful gas portions from the raw gas.

It is to be understood that the method of the invention is not limited to the use of water in the narrowest sense as the washing liquid. This washing liquid can, because of the particular construction of the scrubber of the invention, be in the form of all types of liquids which are capable of becoming impure by taking up to a greater or lesser extent gaseous, liquid, or solid components initially contained in the raw gas and removed therefrom with the scrubber of the invention, the only additional requirement being that the liquid used for washing also be capable of forming a curtain which can be broken up into droplets by the energy of the flowing gas so that the cross section in which removal of dust particles or the like takes place in the treated gas can be significantly increased and it is possible for all particles of dust of the like to be taken up by liquid droplets.

What is claimed is:

1. In a gas scrubbing method, the steps of dropping a curtain of liquid downwardly along the interior of a converging portion of a Venturi which has above said converging portion a throat and a diverging portion above said throat, so that the curtain falls in a vertical downward direction, and forming with said falling curtain a liquid wall enclosing at least part of a vertical passage for receiving an upwardly flowing gas to be cleaned and forming with the structure from which the liquid curtain drops a baffle preventing direct flow of a gas along the Venturi axis toward the throat thereof and instead compelling the gas to flow around the baffle out of the passage which is enclosed at least in part by the falling curtain of liquid before reaching the throat of the Venturi, simultaneously directing upwardly through the Venturi toward said converging portion thereof along the interior of said passage toward said baffle at least some gas to be cleaned by the dropping curtain of liquid at a speed sufficiently great for the gas to flow around the baffle to the throat of the Venturi while deflecting the falling liquid upwardly through the Venturi with the gas in the form of liquid droplets which become distributed throughout the cross section of the upwardly flowing stream of gas, so that the gas and droplets of said liquid flow upwardly through the converging portion of the Venturi into the throat thereof and then into the diverging portion thereof, and then separating the liquid from the gas downstream of the Venturi throat so that impurities are removed from the gas with the liquid separated therefrom, said curtain of liquid which is dropped forming one of a plurality of curtains of liquid which respectively are dropped and form a plurality of opposed liquid walls enclosing at least part of said passage in which the gas flows upwardly toward the baffle and throat of the Venturi while dividing the stream of gas in the converging portion of the Venturi as the gas flows around the baffle into a plurality of subsidiary gas streams which are directed to the Venturi throat and which deflect the plurality of curtains with the subsidiary streams upwardly toward the Venturi throat.

2. In a method as recited in claim 1 and including the step of uniting the subsidiary gas streams and the droplets therein at the throat of the Venturi.

3. In a gas scrubber, elongated generally vertical Venturi means having a lower entrance zone above which said Venturi means has a converging portion followed by a Venturi throat which in turn is followed by a diverging Venturi portion, liquid-supply means situated in said Venturi means at said entrance zone thereof for dropping downwardly along the interior of the Venturi means a curtain of liquid forming a falling liquid wall enclosing at least part of a passage for receiving a gas flowing upwardly through said Venturi means toward said converging portion thereof, said liquid-supply means blocking the flow of gas directly into the throat of the Venturi and forming a baffle around which the gas must flow before reaching the Venturi throat, thus compelling the gas to deflect the liquid curtain upwardly with the gas toward the Venturi throat, and gas supply means connected to an inlet of said Venturi means below said liquid-supply means for directing gas to be cleaned upwardly along the interior of said Venturi means toward said liquid-supply means, separator means forming an extension of and situated downstream of said Venturi means in communication therewith for separating liquid from a gas downstream of said Venturi means, receiving means connected to and communicating with said separator means for receiving the separated liquid therefrom, and return conduit means connected to and communicating with said receiving means and said liquid-supply means for returning the separated liquid to the latter.

4. The combination of claim 3 and wherein a perforated cone is situated between said Venturi means and separator means for providing a uniform flow of fluid from said Venturi means to said separating means.

5. The combination of claim 3 and wherein a conduit means is situated downstream of and communicates with said separator means for changing the direction of flow of fluid beyond said separator means, an additional separator means communicating with the latter conduit means for further separating liquid from a gas whose direction of flow has been changed downstream of said first-named separator means, and additional return conduit means communicating with said additional separator means and said liquid-supply means for returning to the latter liquid separated from a gas at said additional separator means.

6. The combination of claim 3 and wherein an adjusting means is operatively connected with said liquid-supply means for adjusting the elevation of the latter with respect to said Venturi means.

* * * * *